(12) United States Patent
Yang et al.

(10) Patent No.: US 9,864,472 B2
(45) Date of Patent: Jan. 9, 2018

(54) TOUCH DRIVING DETECTION CIRCUIT, DISPLAY PANEL AND DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventors: Kangpeng Yang, Xiamen (CN); Yumin Xu, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 219 days.

(21) Appl. No.: 14/863,243

(22) Filed: Sep. 23, 2015

(65) Prior Publication Data
US 2016/0188049 A1    Jun. 30, 2016

(30) Foreign Application Priority Data

Dec. 29, 2014  (CN) .......................... 2014 1 0834421

(51) Int. Cl.
   G06F 3/045    (2006.01)
   G06F 3/044    (2006.01)
(52) U.S. Cl.
   CPC .................... G06F 3/044 (2013.01)
(58) Field of Classification Search
   CPC .... G06F 3/0416; G06F 3/016; G06F 3/03547; G06F 3/0488
   See application file for complete search history.

(56) References Cited

U.S. PATENT DOCUMENTS

| | | | | |
|---|---|---|---|---|
| 2014/0049705 A1* | 2/2014 | Sugita | .................. | G06F 3/0416 349/12 |
| 2015/0277651 A1* | 10/2015 | Zhang | .................. | G06F 3/0416 345/173 |

FOREIGN PATENT DOCUMENTS

| | | |
|---|---|---|
| CN | 101632060 A | 1/2010 |
| CN | 102880368 A | 1/2013 |
| CN | 103513808 A | 1/2014 |
| CN | 103543893 A | 1/2014 |
| CN | 103955311 A | 7/2014 |

* cited by examiner

*Primary Examiner* — William Boddie
*Assistant Examiner* — Alecia D English

(57) ABSTRACT

A touch driving detection circuit includes a plurality of region driving detection circuits. Each of the plurality of region driving detection circuits includes a control module, a strobe output module, a detection module, a first trigger signal line and a second trigger signal line. The first trigger signal line is configured to input a first trigger signal to the control module to control the strobe output units to output touch scanning signals simultaneously. The detection module is configured to detect whether a touch is present in the touch region and when a touch is present, the detection module triggers the second trigger signal line in the region driving detection circuit to input a primary trigger signal, so that the control module controls the strobe output units to output the touch scanning signals sequentially, thereby determining a location of a touched point in the touch region.

13 Claims, 10 Drawing Sheets

TOUCH DRIVING DETECTION CIRCUIT, DISPLAY PANEL AND DISPLAY DEVICE

CROSS-REFERENCE TO RELATED APPLICATION

This application claims priority to Chinese Application No. 201410834421.4, filed Dec. 29, 2014, which is herein incorporated by reference in its entirety.

TECHNICAL FIELD

The present disclosure relates to the field of display technologies and, in particular, to a touch driving detection circuit, a display panel and a display device.

BACKGROUND

With rapid development of display technologies, touch screens have been more and more popular among users. Currently, an in-cell touch screen, where a touch component is embedded into a display panel to reduce both the entire thickness of the module and the manufacturing cost of the touch screen, is increasingly popular among display panel producers, and hence research on a manner of driving the in-cell touch screen has attracted attention.

An existing in-cell touch screen includes: an array substrate, a color filter substrate disposed opposite to the array substrate, and a liquid crystal layer between the array substrate and the color filter substrate. Driving electrodes and sensing electrodes are disposed on a side of the color filter substrate that faces the liquid crystal layer, each of the driving electrodes is connected with a touch driving circuit by a lead, and a capacitor is formed by the driving electrode and the sensing electrode. When the touch screen operates, the driving electrodes sequentially receive touch scanning signals outputted from the touch driving circuit, and the sensing electrodes detect touch signals. When a finger touches a position on the touch screen, the capacitance between the driving electrode and sensing electrode at the touched position is varied, and the touched position can be determined by the calculated variation of the capacitance.

However, in the existing touch driving circuit, the touch scanning signals need to be outputted to the driving electrodes successively, thus, if the current driving electrode has not yet received the touch scanning signal, the following driving electrode cannot receive the touch scanning signal, so that the existing touch driving circuit is disadvantageous as having a low report rate and large power consumption.

SUMMARY

In view of the above problem, embodiments of the present disclosure provide a touch driving detection circuit, a display panel and a display device in order to improve the report rate of the touch driving detection circuit and decrease the power of the touch driving detection circuit.

In a first example, embodiments of the disclosure provide a touch driving detection circuit, including:
 a plurality of region driving detection circuits respectively corresponding to a plurality of touch regions;
 wherein each of the plurality of region driving detection circuits includes a control module, a strobe output module, a detection module, a first trigger signal line and a second trigger signal line, and the strobe output module includes a plurality of stages of strobe output units;
 the first trigger signal line is connected with the control module and configured to transmit a first trigger signal to the control module, the control module is configured to control the plurality of stages of strobe output units to be turned on simultaneously according to the first trigger signal to output touch scanning signals simultaneously, and the detection module is configured to detect whether a touch is present in the touch region corresponding to the first trigger signal line according to the touch scanning signals; and
 when the detection module has detected that a touch is present in the touch region corresponding to the first trigger signal line, the detection module triggers the second trigger signal line in the region driving detection circuit to input a primary trigger signal to the control module, so that the control module controls the plurality of stages of strobe output units in the region driving detection circuit to be turned on sequentially according to the primary trigger signal to output the touch scanning signals sequentially, thereby determining a location of a touched point in the touch region.

In a second example, embodiments of the disclosure provide a display panel, including the touch driving detection circuit described in the first example.

In a third example, embodiments of the disclosure provide a display device, including the display panel described in the second example.

With the touch driving detection circuit, the display panel and the display device of the embodiments of the disclosure, the touch driving detection circuit includes a plurality of region driving detection circuits, the control module of each region driving detection circuit controls the plurality of stages of strobe outputting units to be turned on simultaneously according to the received detection signal to output the touch scanning signals, and the detection module of each region driving detection circuit detects, corresponding to the touch scanning signals, whether a touch is present in the touch region corresponding to the region driving detection circuit. If a touch is present in the touch region corresponding to the region driving detection circuit, the detection module triggers the second trigger signal line in the region driving detection circuit to input a primary trigger signal to the control module, thereby controlling the plurality of stages of strobe outputting units to be turned on sequentially to output the touch scanning signals sequentially and further determining a specific position of the touched point in the touch region. Since the touch driving circuit is divided based on regions, before the touch scanning is performed, it is first detected whether a touch is present in the touch region corresponding to each region driving detection circuit. If a touch is present in the touch region, the touch region is scanned sequentially to determine a position of the touched point in the touch region, thereby achieving individual touch of different touch regions, saving time of touch scanning, improving the report rate of the driving detection circuit and decreasing the power consumption of the driving detection circuit.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

Other features, objects and advantages of the disclosure will become apparent from the following detailed description made to nonrestrictive embodiments by reading the accompanying drawings below, in which.

Figure 1:
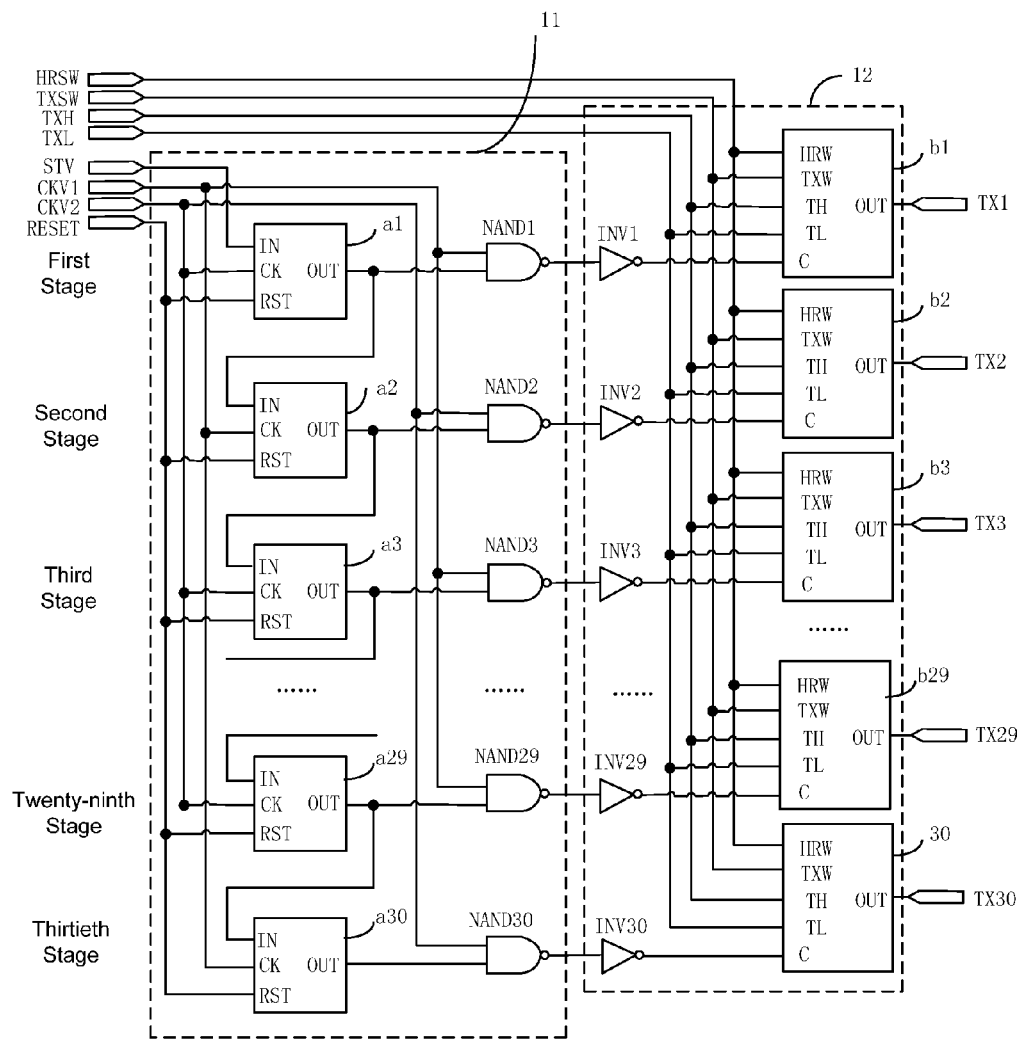
FIG. 1 is a schematic diagram of the structure of a touch driving circuit in the related art.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The disclosure will be further illustrated in detail below in conjunction with the accompanying drawings and embodiments. It may be understood that embodiments described herein are merely for explaining the disclosure rather than limiting the disclosure. Additionally, it is noted that merely partial contents associated with the disclosure rather than all contents are illustrated in the accompanying drawings for ease of description, and identical or similar reference numbers in the accompanying drawings are used for representing identical or similar elements or elements having identical or similar functions.

FIG. 1 is a schematic diagram of the structure of a touch driving circuit in the related art. As shown in FIG. 1, the touch driving circuit includes a shift register module 11 and a strobe output module 12, where, the shift register module 11 includes: M stages of shift registers (a1 to a30 shown in FIG. 1), M stages of NAND gates (NAND1 to NAND30 shown in FIG. 1), a trigger signal line STV, a first clock signal line CKV1, a second clock signal line CKV2 and a reset signal line RESET, and the strobe output module 12 includes M stages of inverters (INV1 to INV30 shown in FIG. 1), M stages of strobe output units (b1 to b30 shown in FIG. 1), a first control signal line HRSW, a second control signal line TXSW, a first potential maintaining signal line TXH and a second potential maintaining signal line TXL, where, each of the M stages of shift registers corresponds to one of the M stages of strobe output units, respectively, and M is a positive integer, such as equal to 30. Each stage of shifter register includes: an input terminal IN, a clock signal inputting terminal CK and a reset signal inputting terminal RST; each stage of strobe output unit includes: a first control terminal HRW, a second control terminal TXW, a first potential maintaining terminal TH, a second potential maintaining terminal TL, a third control terminal C and an output terminal OUT; the input terminal IN of the first stage of shift register a1 is connected with the trigger signal line STV, the input terminal of each of the second stage of shift register a2 to the 30-th stage of shift register a30 is connected with the output terminal OUT of a preceding stage of shift register, the clock signal inputting terminals CK of the first stage of shift register a1 to the 30-th stage of shift register a30 are alternately connected with the first clock signal line CKV1 and the second clock signal line CKV2, the reset signal inputting terminal RST of each of the first stage of shift register a1 to the 30-th stage of shift register a30 is connected with the reset signal line RESET, the first input terminals of the first stage of NAND gate NAND1 to the 30-th stage of NAND gate NAND30 are alternately connected with the second clock signal line CKV2 and the first clock signal line CKV1, the second input terminals of the first stage of NAND gate NAND1 to the 30-th stage of NAND gate NAND30 are connected with the output terminal of the corresponding shift register, respectively, the output terminals of the first stage of NAND gate NAND1 to the 30-th stage of NAND gate NAND30 are connected with the input terminal of the corresponding inverter INV from the strobe output module 12, respectively, the output terminals of the inverters INV are connected with the third control terminals C of the strobe output units b, respectively, all of the first control terminal HRW, the second control terminal TXW, the first potential maintaining terminal TH and the second potential maintaining terminal TL of each stage of strobe output unit b are connected with the first control signal line HRSW, the second control signal line TXSW, the first potential maintaining signal line TXH and the second potential maintaining signal line TXL, respectively, and the output terminals OUT of the strobe output units b are configured to output touch scanning signals TX1 to TX30.

In the existing touch driving circuit, if a trigger signal is inputted from the touch signal line STV, the first stage of shift register a1 to the 30-th stage of shift register a30 sequentially output selection signals under the control of the trigger signal, thereby controlling the first stage of strobe output unit b1 to the 30-th stage of strobe output unit b30 to sequentially output the touch scanning signals TX1 to TX30. In the related art, the touch scanning signals must be outputted sequentially, i.e. before the current strobe output unit has output the touch scanning signal, the following stage of shift register cannot start to perform scanning, so that the existing touch driving circuit is disadvantageous as having a low report rate and large power consumption.

Figure 2:
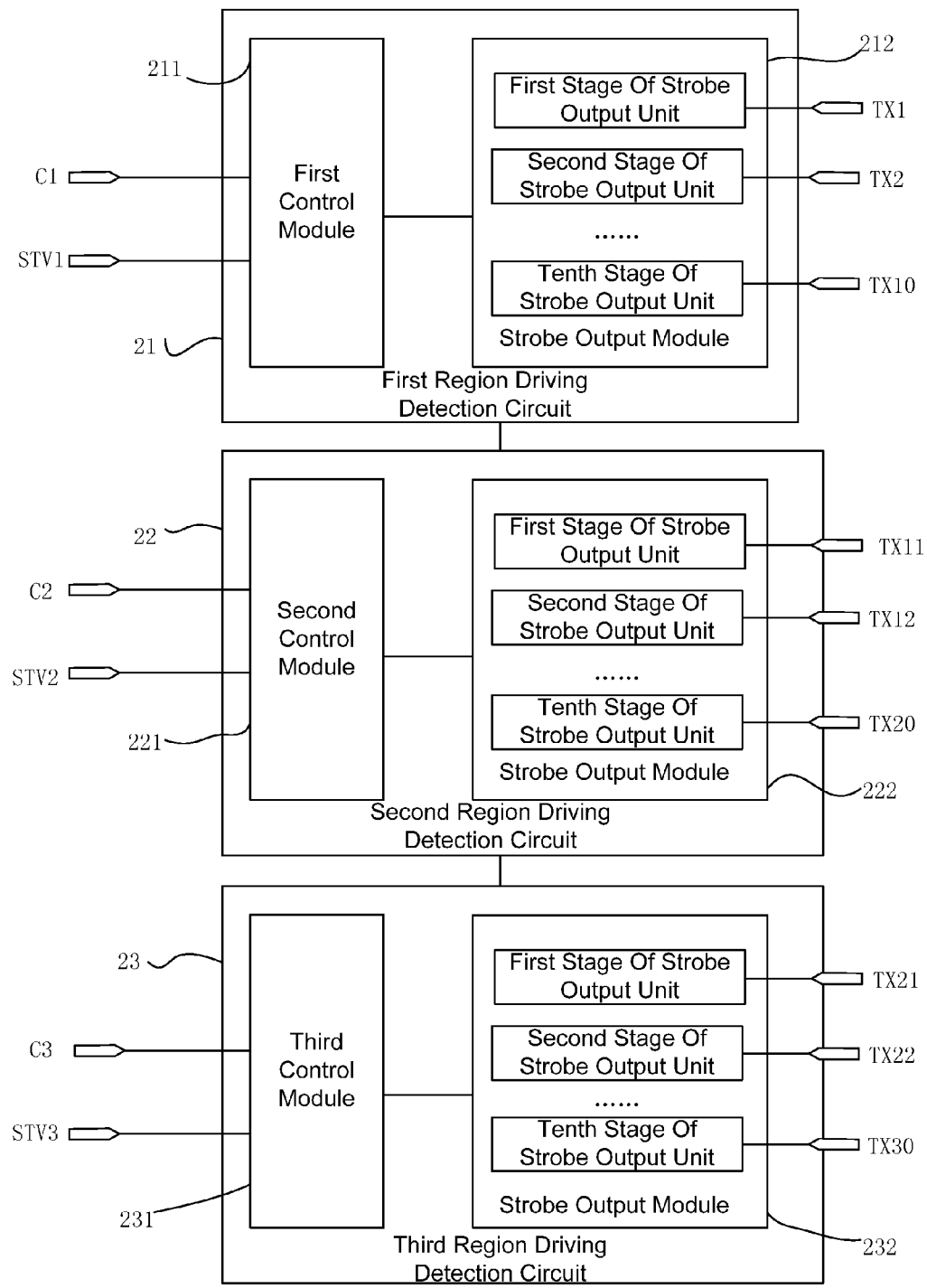
FIG. 2 is a schematic diagram of the structure of a touch driving detection circuit, according to embodiments of the disclosure.

Embodiments of the disclosure provide a touch driving detection circuit. FIG. 2 is a schematic diagram of the structure of a touch driving detection circuit, according to embodiments of the disclosure. As shown in FIG. 2, the touch driving detection circuit includes: a plurality of region driving detection circuits corresponding to a plurality of touch regions, where, three region driving detection circuits, i.e. a first region driving detection circuit 21 corresponding to a first touch region, a second region driving detection circuit 22 corresponding to a second touch region, and a third region driving detection circuit 23 corresponding to a third touch region, may be provided. The first region driving detection circuit 21 includes a first control module 211, a first strobe output module 212, a first detection module (not shown), a first trigger signal line C1 and a second trigger signal line STV1. The first strobe output module 212 includes a plurality of strobe output units (such as, ten stages of strobe output units shown in FIG. 2, which output the corresponding touch scanning signals TX1 to TX10). The second region driving detection circuit 22 includes a second control module 221, a second strobe output module 222, a second detection module (not shown), a first trigger signal line C2 and a second trigger signal line STV2. The second strobe output module 222 includes a plurality of strobe output units (such as, ten stages of strobe output units shown in FIG. 2, which output the corresponding touch scanning signals TX11 to TX20). The third region driving detection circuit 23 includes a third control module 231, a third strobe output module 232, a third detection module (not shown), a first trigger signal line C3 and a second trigger signal line STV3. The third strobe output module 232 includes a plurality of strobe output units (such as, ten stages of strobe output units shown in FIG. 2, which output touch the corresponding scanning signals TX21 to TX30).

Each of the first trigger signal lines is connected with the corresponding one of the control modules to transmit a first trigger signal to the control module. The control module controls, according to the first trigger signal, the plurality of stages of strobe output units to be turned on simultaneously to output touch scanning signals simultaneously. The detection module detects, according to the touch scanning signals, whether a touch is present in the touch region corresponding to the first trigger signal line. When the detection module has detected that the touch is present in the touch region corresponding to the first trigger signal line, the detection module triggers the second trigger signal line in the region driving detection circuit corresponding to the touch region to input a primary trigger signal to the control module. The control module controls, according to the primary trigger signal, the plurality of stages of strobe output units in the region driving detection circuit to be turned on sequentially to output the touch scanning signals sequentially, thereby determining a location of a touched point in the touch region.

It is noted that two adjacent region driving detection circuits from the plurality of region driving detection circuits can be connected with each other by some common signal lines. The output terminal of each of the plurality of strobe output units from the touch driving detection circuit is connected with the touch driving electrode of a display panel, and the display panel is further provided with a touch sensing electrode, the touch driving electrode is insulated from the touch sensing electrode, and the touch driving electrode and the touch sensing electrode both are made from transparent conducting material, which may be selected from Indium Tin Oxide (ITO), Indium Zinc Oxide (IZO), combination of thereof or other transparent conducting materials. In some embodiments, the display panel may be an in-cell display panel integrated with a capacitive touch function. When the display panel is touched, since an electric field is present in the human body, a finger and the touch driving electrode and the touch sensing electrode of the display panel form a coupling capacitance. Since the capacitance of the touched point is changed, an induction current is flowed from the touch driving electrode and the touch sensing electrode to the touched point, so that the detection circuit can accurately compute a position of the touched point. In some embodiments, the circuit structure of the detection circuit is not limited, as long as such circuit structure can detect a change of the current.

In some embodiments, before a touch scanning is performed, it is determined whether a touch is present in the touch regions respectively corresponding to the first region driving detection circuit 21, the second region driving detection circuit 22 and the third region driving detection circuit 23. When it is detected that the touch is present in the touch region, specific position of the touched point in the touch region is then determined. Before the touch scanning is performed, a first trigger signal is inputted to the control module 211 of the first region driving detection circuit 21 by the first trigger signal line C1 to control ten stages of strobe output units in the first region driving detection circuit 21 to be turned on simultaneously to output touch scanning signals TX1 to TX10 simultaneously, and then a first trigger signal is inputted to the control module 221 of the second region driving detection circuit 22 by the first trigger signal line C2 to control ten stages of strobe output units in the second region driving detection circuit 22 to be turned on simultaneously to output touch scanning signals TX11 to TX20, and then a first trigger signal is yet inputted to the control module 231 of the third region driving detection circuit 23 by the first trigger signal line C3 to control ten stages of strobe output units in the third region driving detection circuit 23 to be turned on simultaneously to output touch scanning signals TX21 to TX30. By performing three scannings, it can be determined whether a touch is present in the first touch region corresponding to the first region driving detection circuit 21, the second touch region corresponding to the second region driving detection circuit 22 and the third touch region corresponding to the third region driving detection circuit 23. When the detection module has detected that the touch is not present in the first touch region corresponding to the first trigger signal line C1, the second touch region corresponding to the second trigger signal line C2, or the third touch region corresponding to the third trigger signal line C3, the control module performs next touch detection.

When a finger touches a touch region, the induction current of the touch sensing electrode is changed, and the detection circuit can detect the change of the induction current, thereby determining that a touch is present in the touch region. For example, the first trigger signal line C1 corresponding to the first region driving detection circuit 21, the first trigger signal line C2 corresponding to the second region driving detection circuit 22, and the first trigger signal line C3 corresponding to the third region driving detection circuit 23 receive the first trigger signals sequentially; and after three scannings are performed, the detection circuit has detected that the touch is present in the second touch region corresponding to the second region driving detection circuit 22. In such example, the detection circuit triggers the second trigger signal line STV2 in the second region driving detection circuit 22 to input a primary trigger signal to control ten stages of strobe output units in the second region driving detection circuit 22 to output the touch scanning signal TX11 to TX20 sequentially to perform ten scannings in total, thereby determining a specific position of the touched point in the second touch region. Therefore thirteen scannings are performed in total from the first touch region to the third touch region. In the related art, however, the touch driving circuit needs to perform thirty scannings. In this example, it can be seen that the number of scannings is decreased from thirty to thirteen by using the solution of disclosure, increasing the report rate of the touch driving circuit by 2.3 times, and correspondingly decreasing the power consumption. In such a process, the touch is not present in the first touch region corresponding to the first region driving detection circuit 21 and the third touch region corresponding to the third region driving detection circuit 23, so that the control module performs next touch detection. That is, after performing three scannings, the control module performs next touch detection immediately to determine whether a touch is present in the first touch region, the second touch region and the third touch region, thus improving the report rate of the touch driving circuit. Alternatively, the control module waits until next touch detection is performed at next frame to determine whether a touch is present in the first touch region, the second touch region and the third touch region, thus decreasing power consumption of the touch driving circuit. Also, if it is detected that the touch is not present in the first touch region to the third touch region for example, the scanning is ended. In this case, the touch driving detection circuit performs three scannings, so that the number of scannings is decreased from thirty to three if compared with the related art, thus increasing the report rate of the touch driving circuit by ten times and significantly decreasing the power consumption.

It is noted that illustratively, the embodiments include three region driving detection circuits, and the strobe output module in each of the region driving detection circuits includes ten stages of strobe output units, but the disclosure is not limited thereto. Other embodiments of the disclosure may include a plurality of the region driving detection circuits, and the number of the strobe output units included in the strobe output module in each of the region driving detection circuits may be the same or may also be different, and the number of the region driving detection circuits and the number of the strobe output units are not limited here. In the following description for example, three region driving detection circuits are included, and the strobe output module in each of the region driving detection circuits includes ten stages of strobe output units for sake of description.

The control module and the strobe output module in each of the region driving detection circuits are described below.

Figure 3:
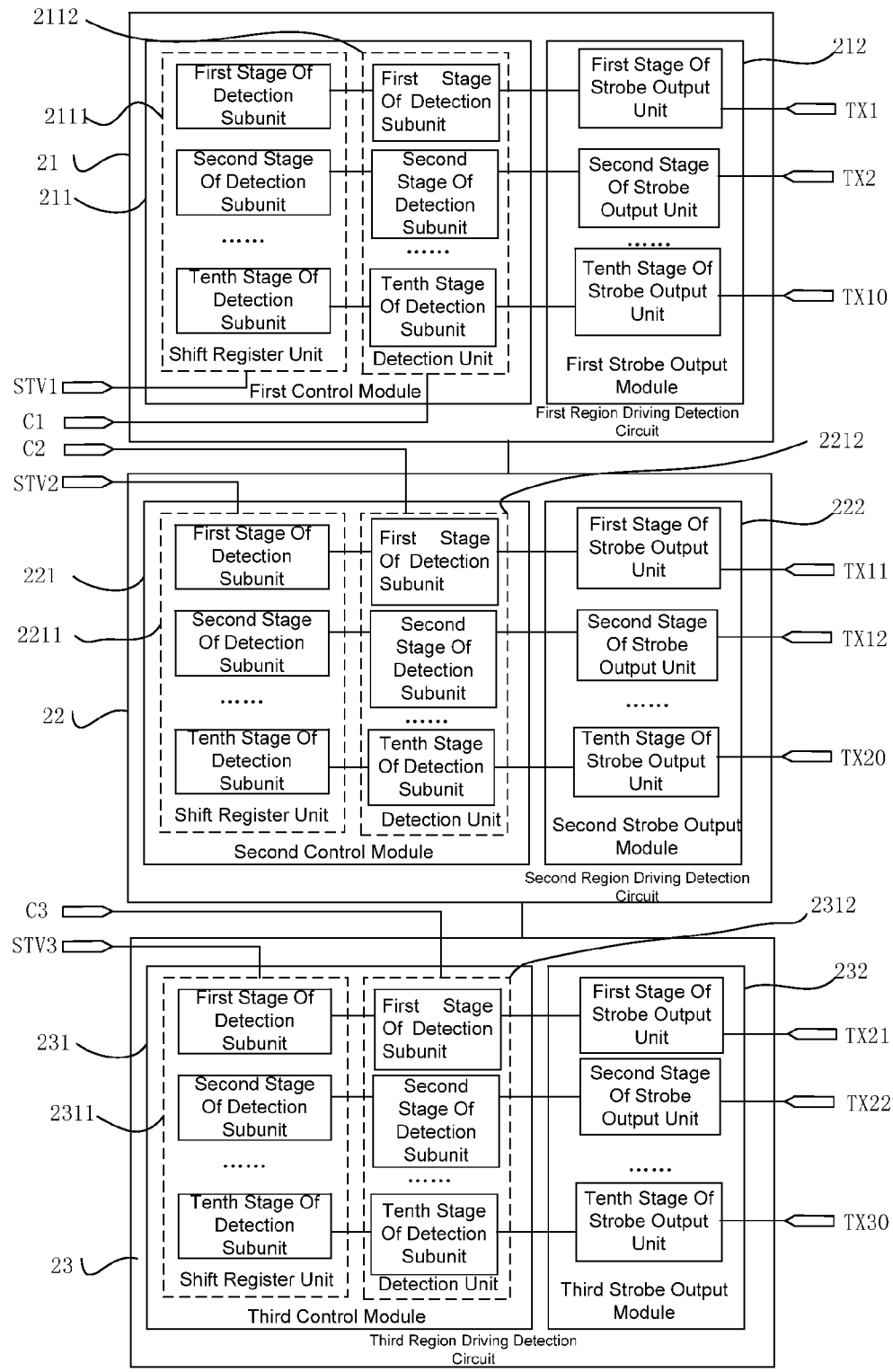
FIG. 3 is a schematic diagram of the structure of another touch driving detection circuit, according to embodiments of the disclosure.

FIG. 3 is a schematic diagram of the structure of another touch driving detection circuit, according to embodiments of the disclosure. As shown in FIG. 3, the control module in each of the region driving detection circuits includes a shift register unit and a detection unit, the shift register unit includes a plurality of stages of shift register subunits, the detection unit includes a plurality of stages of detection subunits, the strobe output module includes a plurality of stages of strobe output units, the shift register subunits correspond to the detection subunits respectively, and the detection subunits correspond to the strobe output units, respectively. For example, the first control module 211 of the first region driving detection circuit 21 includes a shift register unit 2111 and a detection unit 2112, the first trigger signal line C1 is connected with the detection unit 2112, and the second trigger signal line STV1 is connected with the shift register unit 2111. A first stage of shift register subunit of the shift register unit 2111 is connected with a first stage of detection subunit of the detection unit 2112, and the first stage of detection subunit is connected with the first stage of strobe output unit of the first strobe output unit 212. An electric connection configuration in the second region driving detection circuit 22 and the third region driving detection circuit 23 is the same as the electric connection configuration in the first region driving detection circuit 21, which is not repeated.

Figure 4:
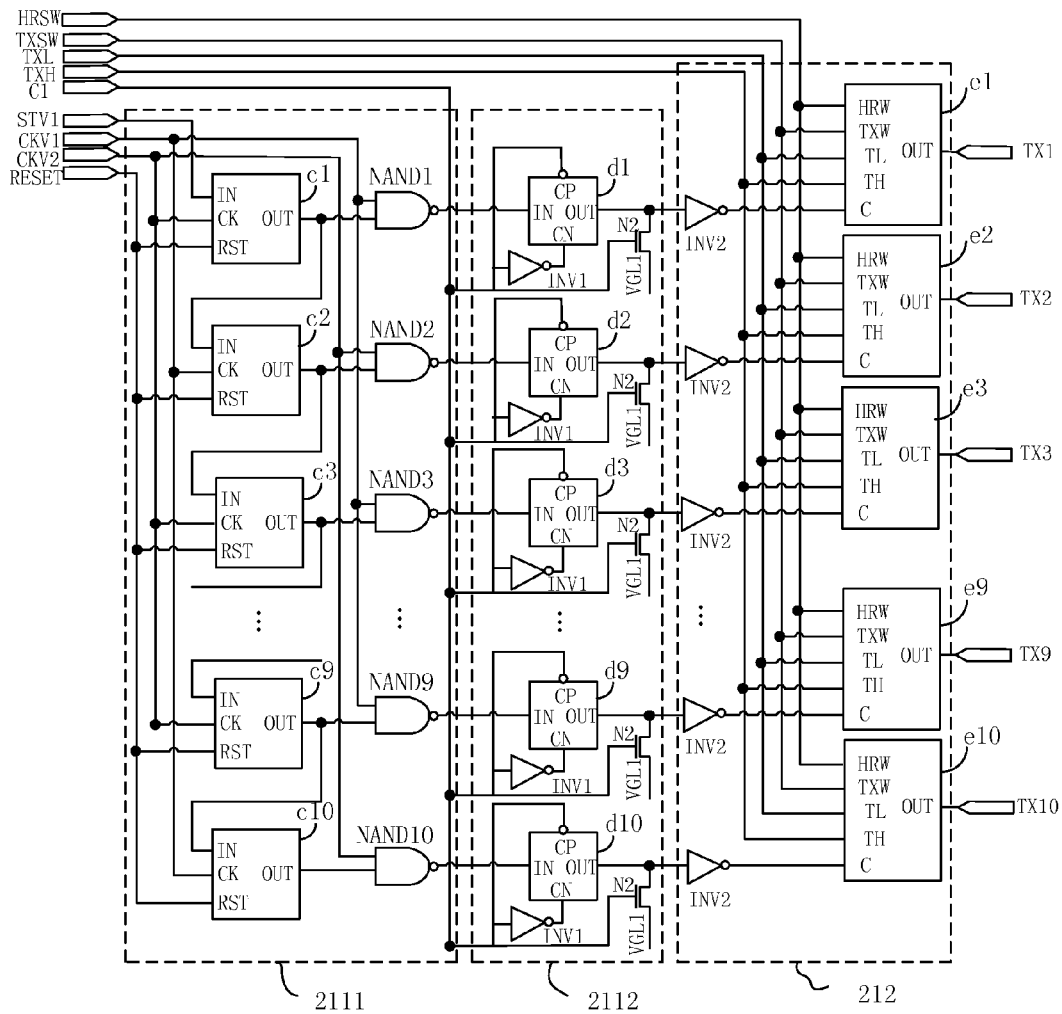
FIG. 4 is a schematic diagram of the structure of the first region driving detection circuit, according to embodiments of the disclosure.

FIG. 4 is a schematic diagram of the structure of the first region driving detection circuit, according to embodiments of the disclosure. In the first region driving detection circuit, the shift register unit 2111 includes ten stages of shift register subunits, and each stage of the shift register subunit includes a shift register circuit ($c_1$ to $c_{10}$ shown in FIG. 4), an NAND gate NAND (NAND1 to NAND10 shown in FIG. 4), a first clock signal line CKV1, a second clock signal line CKV2 and a reset signal line RESET. The shift register circuit c includes a shift register inputting terminal IN, a clock signal terminal CK, a reset terminal RST, and a shift register outputting terminal OUT, where, a shift register inputting terminal IN of the first stage of shift register circuit $c_1$ is connected with the second trigger signal line STV1 corresponding to the first region driving detection circuit, where the first region driving detection circuit includes the first stage of shift register circuit, and the shift register inputting terminal IN of each of the second stage of shift register circuit $c_2$ to the tenth stage of shift register circuit $c_{10}$ is connected with the shift register outputting terminal OUT of the preceding stage of shift register circuit. The clock signal terminals CK of the first stage of shift register circuit $c_1$ to the tenth stage of the shift register circuit $c_{10}$ are alternately connected with the second clock signal line CKV2 and the first clock signal line CKV1, and the first clock signal inputted from the first clock signal line CKV1 is inverse to the second clock signal inputted from the second clock signal line CKV2. The reset terminals RST of the first stage of the shift register circuit $c_1$ to the tenth stage of the shift register circuit $c_{10}$ all are connected with the reset signal line RESET, the first input terminals of the first stage of NAND gate NAND1 to the tenth stage of NAND gate NAND10 are connected with shift register outputting terminals of the corresponding shift register circuits, the second input terminals of the first stage of NAND gate NAND1 to the tenth stage of NAND gate NAND10 are alternately connected with the first clock signal line CKV1 and the second clock signal line CKV2, and the output terminals of the first stage of NAND gate NAND1 to the tenth stage of NAND gate NAND10 are connected with the corresponding detection subunits, respectively.

It is noted that the structures of both the second region driving detection circuit 22 and the third region driving detection circuit 23 are the same as the structure of the first region driving detection circuit, which is not repeated.

Figure 5:
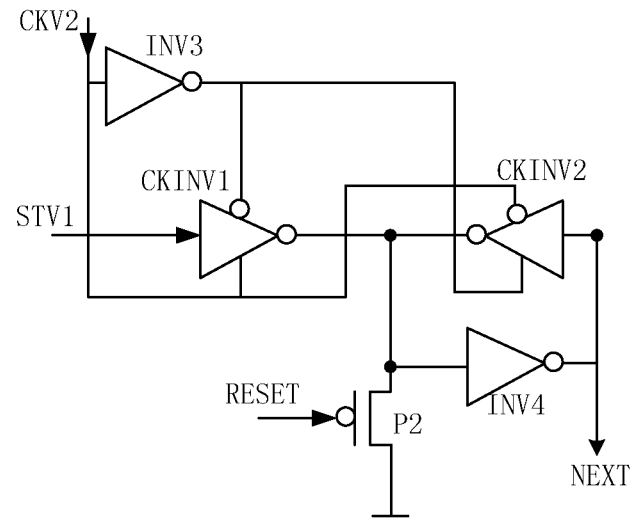
FIG. 5 is a schematic diagram of the structure of a shift register circuit, according to embodiments of the disclosure.

FIG. 5 is a schematic diagram of the structure of a shift register circuit, according to embodiments of the disclosure. As shown in FIG. 5, the shift register circuit includes a first clock inverter CKINV1, a third inverter INV3, a second clock inverter CKINV2, a second transistor P2 and a fourth inverter INV4. The input terminal of the first clock inverter CKINV1 in the first stage of shift register circuit $c_1$ is connected with the second trigger signal line STV1 corresponding to the first region driving detection circuit 21, where the first region driving detection circuit 21 includes the first stage of shift register circuit, the output terminal of the first clock inverter CKINV1 is connected with the output terminal of the second clock inverter CKINV2 and a second terminal of the second transistor P2, the second clock signal line CKV2 is an input terminal of the third inverter INV3, a first control terminal of the first clock inverter CKINV1 and a second control terminal of the second clock inverter CKINV2, an output terminal of the third inverter INV3 is a second control terminal of the first clock inverter CKINV1 and a first control terminal of the second clock inverter CKINV2, a first terminal of the second transistor P2 is connected with the reset signal line RESET, the reset signal inputted from the reset signal line RESET is at a low level before the display panel is powered on and is changed to a high level after the display panel is powered on, a third terminal of the second transistor P2 is connected with the ground, an input terminal of the fourth inverter INV4 is connected with the second terminal of the second transistor P2, an output terminal of the fourth inverter INV4 and an input terminal of the second clock inverter CKINV2 are connected with an input terminal of the first clock inverter from a stage of shift register circuit next to the first stage of shift register circuit, and also connected with the first input terminal of the first stage of NAND gate NAND1, i.e. a secondary trigger signal NEXT outputted from the fourth inverter INV4 is inputted to the second stage of shift register circuit.

In some embodiments, the second transistor P2 may be a P-channel Metal Oxide Semiconductor (PMOS) transistor, and the first terminal, the second terminal, and the third terminals of the second transistor P2 are respectively a gate electrode G, a source electrode S and a drain electrode D of the PMOS transistor. However, this is an example of the second transistor P2. In another example, the second transistor P2 may also be an N-channel Metal Oxide Semiconductor (NMOS) transistor.

It is noted that the structure diagram of the shift register circuit shown in FIG. 5 is an example according to embodiments of the disclosure. In other embodiments of the disclosure, the shift register circuit may further be other structure, which is not limited thereto.

As shown in FIG. 4, the detection unit 2112 includes ten stages of detection subunits, and each of the detection subunits includes a first transmission gate (d1 to d10 shown in FIG. 4), a first inverter INV1 and a first transistor N1, each of the first transmission gates includes an input terminal IN, a positive phase control terminal CP, a negative phase control terminal CN and an output terminal OUT, and the input terminal IN of the first transmission gate is connected with an output terminal of the shift register subunit corresponding to the detection subunit, and specifically, an input terminal IN of the first transmission gate is connected with an output terminal of the NAND gate corresponding to the detection subunit. For example, an input terminal IN of the first transmission gate d1 from the first stage of detection subunit is connected with an output terminal of the first stage of NAND gate NAND1 from the first stage of shift register subunit, the positive phase control terminal CP and a first terminal of the first transistor N1 are connected with the first trigger signal line C1 corresponding to the first region driving detection circuit 21, where the first region driving detection circuit includes the detection unit 2112, the negative phase control terminal CN is connected with the first trigger signal line C1 by the first inverter INV1, the second terminal of the first transistor N1 is connected with an output terminal OUT of the first transmission gate and the strobe output unit corresponding to the detection subunit, the second terminal of the first transistor N1 is configured to output a third control signal to the strobe output unit 212, and a third terminal of the first transistor N1 is configured to receive a first fixed potential VGL1.

In some embodiments, the first transistor N1 may be an NMOS transistor, and the first terminal, the second terminal, and the third terminal of the first transistor N1 are respectively a gate electrode G, a source electrode S and a drain electrode D of the NMOS transistor. In this case, the source electrode of the first NMOS transistor is configured to receive a low level having a constant potential which may be in the range of about −10V to −6V. However, this is an example of the first transistor N1. In another example, the first transistor may also be a PMOS transistor.

Figure 6:
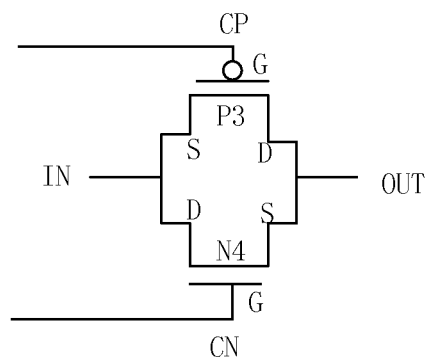
FIG. 6 is a schematic diagram of the structure of a first transmission gate, according to embodiments of the disclosure.

FIG. 6 is a schematic diagram of the structure of a first transmission gate, according to embodiments of the disclosure. As shown in FIG. 6, the first transmission gate may include a third transistor P3 and a fourth transistor N4, the third transistor P3 and the fourth transistor N4 are a P-type transistor and an N-type transistor, respectively. The third transistor P3 and the fourth transistor N4 are connected in parallel with each other, where, a gate electrode G of the third transistor P3 is the positive phase control terminal CP of the first transmission gate, a gate electrode G of the fourth transistor N4 is the negative phase control terminal CN of the first transmission gate, a source electrode S of the third transistor P3 and a drain electrode D of the fourth transistor N4 are connected together at a joint which functions as the input terminal IN of the first transmission gate, and a drain electrode D of the third transistor P3 and a source electrode S of the fourth transistor N4 are connected together at a joint which functions as the output terminal OUT of the first transmission gate.

As shown in FIG. 4, the strobe output module 212 includes ten stages of strobe output units, and each stage of strobe output unit includes a strobe output circuit (e1 to e10 shown in FIG. 4), a first control line HRSW, a second control line TXSW, a first potential maintaining line TXL, and a second potential maintaining line TXH, the strobe output circuit (e1 to e10 shown in FIG. 4) includes a first control terminal HRW, a second control terminal TXW, a first potential maintaining terminal TL, a second potential maintaining terminal TH, a third control terminal C and a strobe output terminal OUT. The first control terminal HRW, a second control terminal TXW, a first potential maintaining terminal TL and a second potential maintaining terminal TH are connected with a first control line HRSW, a second control line TXSW, a first potential maintaining line TXL and a second potential maintaining line TXH, respectively. The third control terminal C is connected with an output terminal of the detection subunit corresponding to the strobe output unit, and specifically, the third control terminal C is connected with the second terminal of the first transistor N1 to receive a third control signal SC1 transmitted by the first transistor N1, the strobe output terminal OUT is configured to turn on, the ten stages of strobe output circuits simultaneously or sequentially, according to received first control signal SHRSW, a second control signal STXSW, a first potential maintaining signal STXL, a second potential maintaining signal STXH and a third control signal SC1, thereby outputting ten touch scanning signals TX1 to TX10 simultaneously or sequentially.

As shown in FIG. 4, each stage of strobe output unit further includes a second inverter INV2, and an input terminal of the second inverter INV2 is connected with the second terminal of the first transistor N1, and an output terminal of the second inverter INV2 is connected with the third control terminal C of the strobe output circuit (e1 to e10 shown in FIG. 4).

It is noted that each stage of the strobe output unit further includes Q second inverters INV2 connected in series with each other (not shown in FIG. 4), an input terminal of the first second inverter from the Q second inverters INV2 is connected with the second terminal of the first transistor N1, and an output terminal of the Q-th second inverter from the Q second inverters INV2 is connected with the third control terminal C of the strobe outputting circuit, where, Q is an odd number. The Q second inverters INV2 connected in series with each other can amplify the third control signal SC1 transmitted by the first transistor N1 and then input the SC1 to the third control terminal C of the strobe outputting circuit. The number of the second inverters INV2 is not limited by the present disclosure.

Figure 7:
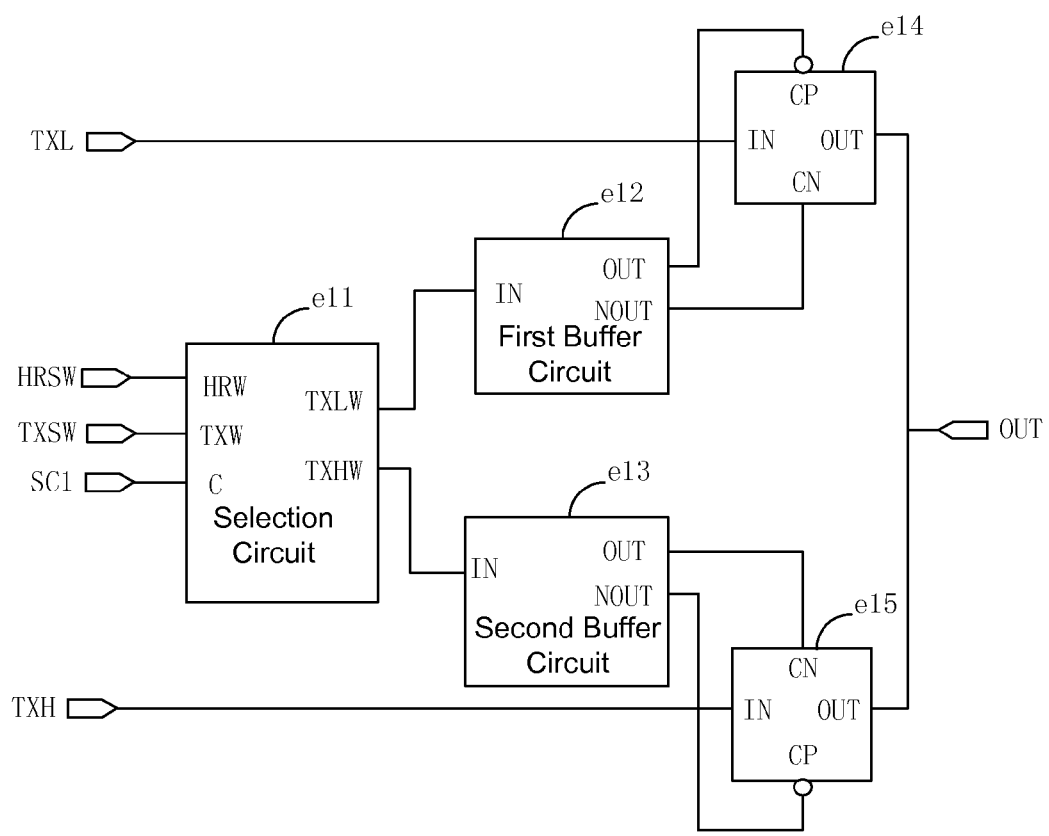
FIG. 7 is a schematic diagram of the structure of a strobe outputting circuit, according to embodiments of the disclosure.

FIG. 7 is a schematic diagram of the structure of a strobe outputting circuit, according to embodiments of the disclosure. As shown in FIG. 7, each stage of strobe outputting circuit can include a selection circuit e11, a first buffer circuit e12, a second buffer circuit e13, a second transmission gate e14 and a third transmission gate e15. The circuit structure of the first buffer circuit e12 may be the same as that of the second buffer circuit e13. A first input terminal HRW of the selection circuit e11 is connected with the first control line HRSW, a second input terminal TXW of the selection circuit e11 is connected with the second control line TXSW, a third input terminal C of the selection circuit e11 is connected with the output terminal SC of the second inverter INV2, a first output terminal TXLW of the selection circuit e11 is connected with an input terminal IN of the first buffer circuit e12, a second output terminal TXHW of the selection circuit e11 is connected with an input terminal IN of the second buffer circuit e13. A first output terminal OUT of the first buffer circuit e12 is connected with the positive phase control terminal CP of the second transmission gate e14, and a second output terminal NOUT of the first buffer circuit e12 is connected with the negative phase control terminal CN of the second transmission gate e14. A first output terminal OUT of the second buffer circuit e13 is connected with the negative phase control terminal CN of the third transmission gate e15, and a second output terminal NOUT of the second buffer circuit e13 is connected with the positive phase control terminal CP of the third transmission gate e15. An input terminal IN of the second transmission gate e14 is connected with the first potential maintaining line TXL, and an input terminal IN of the third transmission gate e15 is connected with the second potential maintaining line TXH. An output terminal OUT of the second transmission gate e14 and an output terminal OUT of the third transmission gate e15 are connected at a joint which functions as a strobe outputting terminal OUT of the strobe outputting circuit.

Figure 8:
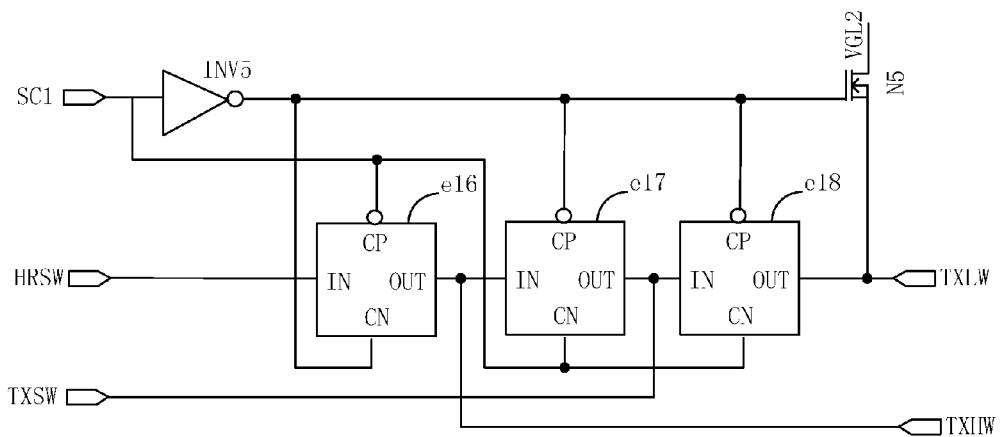
FIG. 8 is a schematic diagram of the structure of a selection circuit, according to embodiments of the disclosure.

FIG. 8 is a schematic diagram of the structure of a selection circuit, according to embodiments of the disclosure. As shown in FIG. 8, the selection circuit e11 may include a fifth inverter INV5, a fourth transmission gate e16, a fifth transmission gate e17, a sixth transmission gate e18 and a fifth transistor N5. The output terminal SC1 of the second inverter INV2 is connected with an input terminal of the fifth inverter INV5, a positive phase control terminal CP of the fourth transmission gate e16, a negative phase control terminal CN of the fifth transmission gate e17 and a negative phase control terminal CN of the sixth transmission gate e18. An output terminal of the fifth inverter INV5 is connected to a negative phase control terminal CN of the fourth transmission gate e16, a positive phase control terminal CP of the fifth transmission gate e17, a positive phase control terminal CP of the sixth transmission gate e18 and a first terminal of the fifth transistor N5. An input terminal of the fourth transmission gate e16 is connected with the first control line HRSW. An output terminal of the fourth transmission gate e16 and an input terminal of the fifth transmission gate e17 are connected together at a joint which functions as a second output terminal TXHW of the selection circuit e11, an output terminal OUT of the fifth transmission gate e17 is connected with the second control line TXSW and an input terminal IN of the sixth transmission gate e18. An output terminal OUT of the sixth transmission gate e18 and a second terminal of the fifth transistor N5 are connected together at a joint which functions as a first output terminal TXLW of the selection circuit e11. A third terminal of the fifth transistor N5 is configured to receive a second fixed potential VGL2.

In some embodiments, the structures of the second transmission gate e14, the third transmission gate e15, the fourth transmission gate e16, the fifth transmission gate e17 and the sixth transmission e18 are the same as the structure of the first transmission gate, i.e. a structure of a transmission gate including an N-type transistor and a P-type transistor, which is not repeated.

The fifth transistor N5 may be an NMOS transistor or an NPN-type transistor, and if the fifth transistor N5 is an NMOS transistor, the first terminal, the second terminal, and the third terminal of the fifth transistor N5 are respectively a gate electrode G, a source electrode S and a drain electrode D of the NMOS transistor. The second fixed potential is a constant low voltage which may be in the range of about −10V to −6V. In other embodiments, the fifth transistor may also be a PMOS transistor or a PNP-type transistor.

Figure 9:
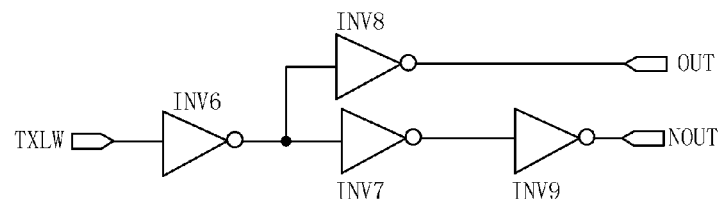
FIG. 9 is a schematic diagram of the first buffer circuit or the second buffer circuit, according to embodiments of the disclosure e

FIG. 9 is a schematic diagram of the first buffer circuit or the second buffer circuit, according to embodiments of the disclosure. As shown in FIG. 9, the first buffer circuit e12 or the second buffer circuit e13 may include a sixth inverter INV6, a seventh inverter INV7, an eighth inverter INV8 and a ninth inverter INV9, an input terminal of the sixth inverter INV6 functions as the input terminal of either the first buffer circuit e12 or the second buffer circuit e13, an output terminal of the sixth inverter INV6 is connected with an input terminal of the seventh inverter INV7 and an input terminal of the eighth inverter INV8, an output terminal of the seventh inverter INV7 is connected with an input terminal of the ninth inverter INV9, an output terminal of the eighth inverter INV8 functions as the first output terminal OUT of the first buffer circuit e12 or the second buffer circuit e13, and an output terminal of the ninth inverter INV9 functions as the second output terminal NOUT of the first buffer circuit e12 or the second buffer circuit e13.

In some embodiments, the first trigger signal is sequentially applied to the first trigger signal line C1 corresponding to the first region driving detection circuit 21, the first trigger signal line C2 corresponding to the second region driving detection circuit 22, the first trigger signal line C3 corresponding to the third region driving detection circuit 23, to control the first transmission gates of the ten stages of detection subunits from each of the region driving detection circuits to be turned off simultaneously, control the first transistors N1 of the ten stages of detection subunits from each of the region driving detection circuits to be turned on simultaneously, and control the ten stages of strobe outputting units to be turned on simultaneously so that 10 stages of the strobe outputting units output scanning signals simultaneously to detect whether a touch is present in the detection region corresponding to the region driving detection circuit.

For each of the region driving detection circuits, if N stages of strobe outputting units from the region driving detection circuit simultaneously output touch scanning signals, a second trigger signal is applied to the first trigger signal line corresponding to the region driving detection circuit to control the first transmission gates of the N stages of detection subunits from the region driving detection circuit to be turned on, and the second trigger signal line in the region driving detection circuit is triggered to input a primary trigger signal to the first stage of shift register circuit to control the first stage of strobe outputting unit to the N-th stage of strobe outputting unit to be turned on sequentially to output the touch scanning signal sequentially.

An operating principle of the touch driving detection circuit provided by an embodiment of the present disclosure is further illustrated below in combination with FIGS. 2 to 9, 10A and 10B, where, the first transistor N1 is an NMOS-type transistor or an NPN-type transistor.

Figure 10A:
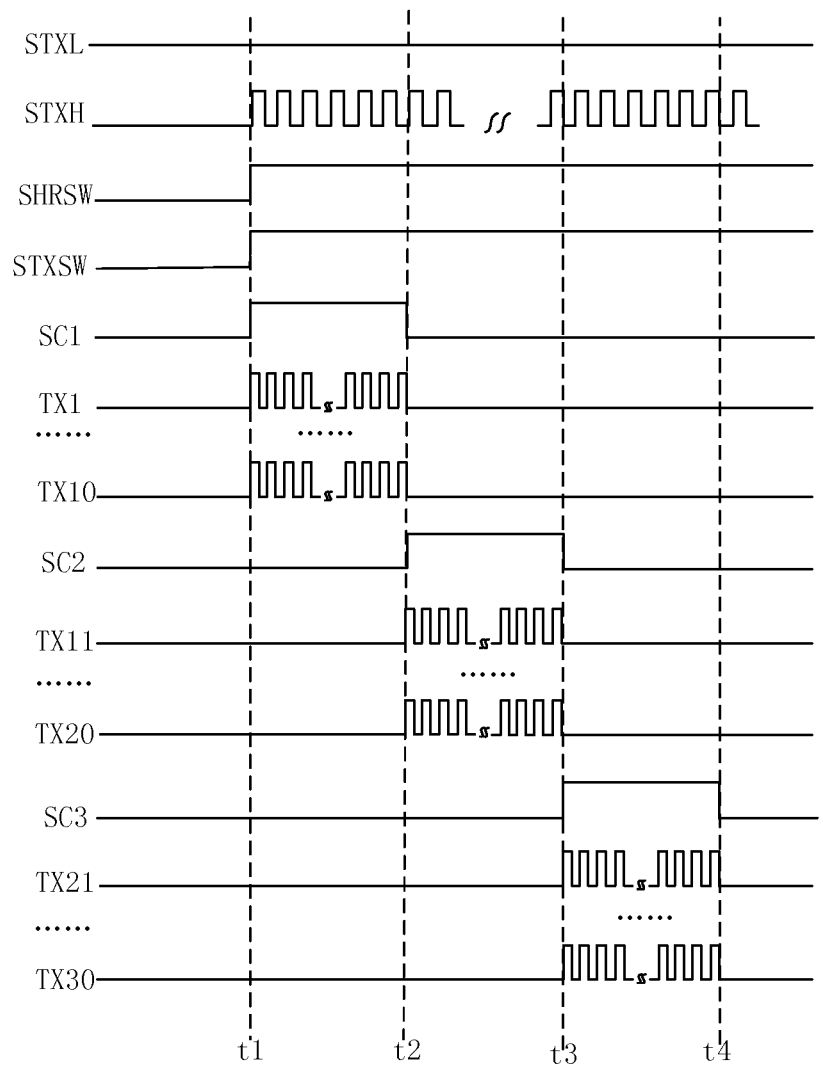
FIG. 10A is a timing diagram of input signals of input terminals and output signals of output terminals from the shifter register units, the detection units and the strobe outputting units in each of the region driving detection circuits before the touch driving detection circuit performs touch scanning, according to embodiments of the disclosure.

FIG. 10A is a timing diagram of input signals of input terminals and output signals of output terminals from the shifter register units, the detection units and the strobe outputting units in each of the region driving detection circuits before the touch driving detection circuit performs touch scanning, according to embodiments of the disclosure.

Figure 10B:
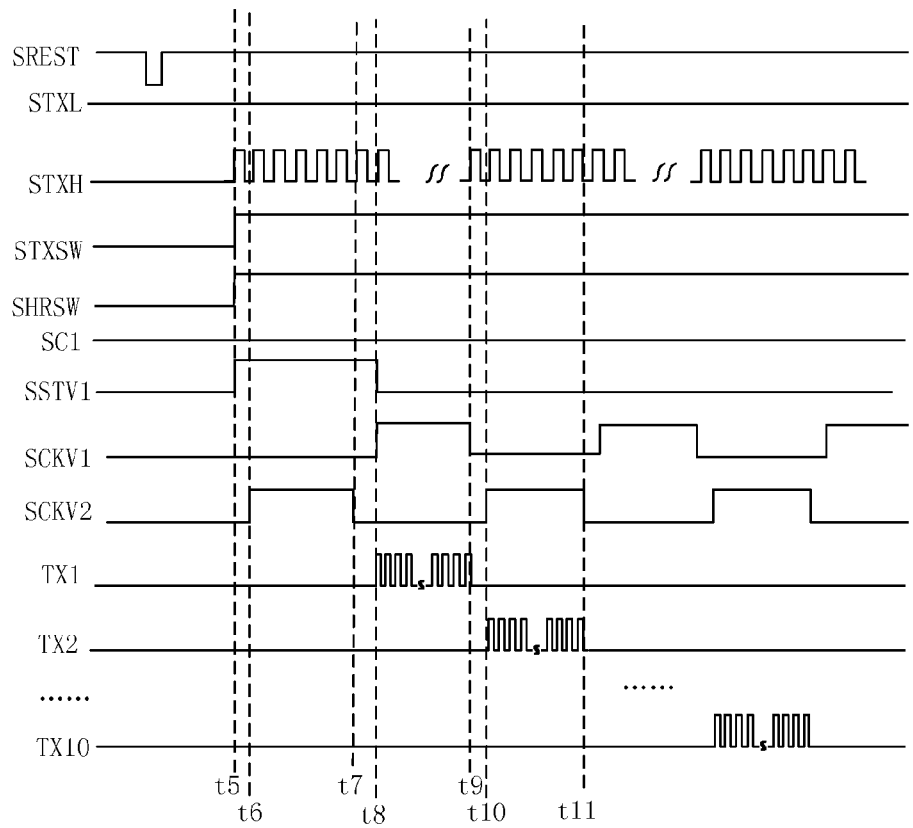
FIG. 10B is a timing diagram of input signals of input terminals and output signals of output terminals from the shifter register units, the detection units and the strobe outputting units in each of the region driving detection circuits when the touch driving detection circuit performs touch scanning, according to embodiments of the disclosure.

FIG. 10B is a timing diagram of input signals of input terminals and output signals of output terminals from the shifter register units, the detection units and the strobe outputting units in each of the region driving detection circuits when the touch driving detection circuit performs touch scanning, according to embodiments of the disclosure.

In FIGS. 10A and 10B, SC1 represents a first trigger signal inputted from the first trigger signal line C1 corresponding to the first region driving detection circuit 21, SC2 represents a first trigger signal inputted from the first trigger signal line C2 corresponding to the second region driving detection circuit 22, SC3 represents a first trigger signal inputted from the first trigger signal line C3 corresponding to the third region driving detection circuit 23, SSTV1 represents a primary trigger signal inputted from the second trigger signal line STV1 corresponding to the first region driving detection circuit 21, SSTV2 represents a primary trigger signal inputted from the second trigger signal line STV2 corresponding to the second region driving detection circuit 22, SSTV3 represents a primary trigger signal inputted from the second trigger signal line STV3 corresponding to the third region driving detection circuit 23, SCKV1 represents a first clock signal inputted from the first clock signal line CKV1, SCKV2 represents a second clock signal inputted from the second clock signal line CKV2, SREST represents a reset signal inputted from the reset signal line REST, TX1 to TX10 represent touch scanning signals outputted from the stages of strobe outputting units in the first region driving detection circuit 21, TX11 to TX20 represent touch scanning signals outputted from the stages of strobe outputting units in the second region driving detection circuit 22, TX21 to TX30 represent touch scanning signals outputted from the stages of strobe outputting units in the third region driving detection circuit 23, STXH represents a second potential maintaining signal inputted from the second potential maintaining line TXH, STXL represents a first potential maintaining signal inputted from the first potential maintaining line TXL, SHRSW represents a first control signal inputted from the first control line HRSW, and STXSW represents a second control signal inputted from the second control line TXSW.

Before the operating principle of the touch driving detection circuit is further illustrated, it is assumed that both the input signal and the output signal are represented as "0" at low level signals and "1" at high level signals, and also in the timing process shown in FIGS. 10A and 10B, eleven time t1 to t11 are posterior sequentially. The first transistor N1 is an NMOS transistor, and the first fixed potential VGL1 received from the source electrode of the NMOS transistor is a constant low level signal.

Before the touch scanning is performed, it is first detected whether a touch is present in the three touch regions respectively corresponding to the three region driving detection circuits. As shown In the timing diagram of FIG. 10A, at time t1, the first potential maintaining signal STXL is at a low level 0, the second potential maintaining signal STXH is a pulse signal, the first control signal SHRSW and the second control signal STXSW are jumped from a low level 0 to a high level 1, the first trigger signal SC1 corresponding to the first region driving detection circuit 21 is jumped from a low level 0 to a high level 1, the first trigger signal SC2 corresponding to the second region driving detection circuit 22 and the first trigger signal SC3 corresponding to the third region driving detection circuit 23 both are at a low level 0.

During a time period between the time t1 and time t2, the first trigger signal SC1 corresponding to the first region driving detection circuit 21 keeps at a high level 1, the first trigger signal SC2 corresponding to the second region driving detection circuit 22 and the first trigger signal SC3 corresponding to the third region driving detection circuit 23 both keep at a low level 0, the first potential maintaining signal STXL keeps at a low level 0, the second potential maintaining signal STXH is a pulse signal, and the first control signal SHRSW and the second control signal STXSW keep at a high level 1, so that the first transistor N1 of each of the ten stages of detection subunits in the detection unit 2112 from the first region driving detection circuit 21 is turned on, and both the third transistor P3 and the fourth transistor N4 of the first transmission gate (d1 to d10) are turned off, and thus the first transmission gate (d1 to d10) is turned off; when the first transistor N1 is turned on, the first fixed low level VGL1 is received by the third terminal of the first transistor N1 and then inputted into the input terminal of the second inverter INV2 in the strobe outputting unit corresponding to each stage of detection subunit and transformed into a third control signal SC1 (a high level 1) by the second inverter INV2 and further inputted to the third control terminal C of the strobe outputting circuit (e1 to e10), and then, the first control terminal HRW of the strobe outputting unit (e1 to e10) receives a high level 1, the second control terminal TXW of the strobe outputting unit (e1 to e10) receives a high level 1, the first potential maintaining terminal TL of the strobe outputting unit (e1 to e10) receives a low level 0 and the second potential maintaining terminal TH of the strobe outputting unit (e1 to e10) receives a pulse signal. In this case, the strobe outputting circuits are turned on simultaneously under the control of the first control signal SHRSW received by the first control terminal, the second control signal STXSW received by the second control terminal, the first potential maintaining signal STXL received by the first potential maintaining terminal, the second potential maintaining signal STXH received by the second potential maintaining terminal and the third control signal SC1 received by the third control terminal, so that the touch scanning signals TX1 to TX10 are outputted simultaneously from output terminals of the first stage of strobe outputting circuit e1 to the tenth stage of strobe outputting circuit e10. That is, when a high level 1 is received by the third control terminal C, the fifth transmission gate e17 and the sixth transmission gate e18 of the selection circuit e11 are turned on, so that a high level 1 is outputted from the first output terminal TXLW and the second output terminal TXHW of the selection circuit e11; after the first buffer circuit e12 and the second buffer circuit e13 receive the high level 1, a high level 1 is outputted from the first output terminal OUT of the first buffer circuit e12 to the positive phase control terminal CP of the second transmission gate e14, and a low level 0 is outputted from the second output terminal NOUT of the first buffer circuit e12 to the negative phase control terminal CN of the second transmission gate e14, so that the second transmission gate e14 is turned off; a high level 1 is outputted from the first output terminal OUT of the second buffer circuit e13 to the negative phase control terminal CN of the third transmission gate e15, and a low level 0 is outputted from the second output terminal NOUT of the second buffer circuit e13 to the positive phase control terminal CP of the third transmission gate e15, so that the third transmission e15 is turned on. Therefore, the pulse signal inputted from the second potential maintaining line TXH is outputted from the output terminals of the strobe outputting circuits (e1 to e10) in the first region driving detection circuit 21 and the touch scanning signals are outputted simultaneously from the output terminals TX1 to TX10 of the strobe outputting circuits (e1 to e10).

In the phase, the first trigger signals inputted from the first trigger signal lines in the second region driving detection circuit 22 and the third region driving detection circuit 23 are at a low level 0, so that the first transistor N1 of each stage of detection subunit of the detection unit 2212 in the second region driving detection circuit 22 is turned off, and thus the second terminal of the first transistor N1 does not input a low level to the input terminal of the second inverter INV2, and as such the third control terminal C of the strobe outputting circuit does not receive a high level, and in this case the strobe outputting units from the second region driving detection circuit 22 and the third region driving detection circuit 23 do not output the touch scanning signals.

At a time t2, the first trigger signal SC1 corresponding to the first region driving detection circuit 21 is jumped from a high level 1 to a low level 0, the first trigger signal SC2 corresponding to the second region driving detection circuit 22 is jumped from a low level 0 to a high level 1, the first trigger signal SC3 corresponding to the third region driving detection circuit 23 also keeps at a low level, the first potential maintaining signal STXL keeps at a low level 0, the second potential maintaining signal STXH is a pulse signal, and the first control signal SHRSW and the second control signal STXSW keep at a high level.

During a time period between the time t2 and time t3, the first trigger signal SC1 corresponding to the first region driving detection circuit 21 keeps at a low level 0, the first trigger signal SC2 corresponding to the second region driving detection circuit 22 keeps at a high level 1, and the first trigger signal SC3 corresponding to the third region driving detection circuit 23 keeps at a low level 0, the first potential maintaining signal STXL keeps at a low level 0, the second potential maintaining signal STXH is a pulse signal, and the first control signal SHRSW and the second control signal STXSW keep at a high level 1, so that the touch scanning signals TX11 to TX20 are outputted simultaneously from the output terminals of the strobe outputting units in the second region driving detection circuit 22. The circuit structures and the operating principles of the detection unit 2212 and the strobe outputting units in the second region driving detection circuit 22 are the same as the circuit structures and the operating principles of the detection unit and the strobe outputting units in the first region driving detection circuit 21, which is not repeated.

At a time t3, the first potential maintaining signal STXL keeps at a low level 0, the second potential maintaining signal STXH is a pulse signal, the first trigger signal SC1 corresponding to the first region driving detection circuit 21 keeps at a low level 0, the first trigger signal SC2 corresponding to the second region driving detection circuit 22 is jumped from a high level 1 to a low level 0, the first trigger signal SC3 corresponding to the third region driving detection circuit 23 is jumped from a low level 0 to a high level 1, and the first control signal SHRSW and the second control signal STXSW keep at a high level 1, so that the touch detection has been finished in the touch region corresponding to the second region driving detection circuit 22, and the touch detection is started in the touch region corresponding to the third region driving detection circuit 23.

During a time period between the time t3 and time t4, the first potential maintaining signal STXL keeps at a low level 0, the second potential maintaining signal STXH is a pulse signal, the first control signal SHRSW and the second control signal STXSW keep at a high level 1, both the first trigger signal SC1 corresponding to the first region driving detection circuit 21 and the first trigger signal SC2 corresponding to the second region driving detection circuit 22 keep at a low level 0, and the first trigger signal SC3 corresponding to the third region driving detection circuit 23 keeps at a high level 1, so that the touch scanning signals TX21 to TX30 are outputted simultaneously from the output terminals of the strobe outputting units in the third region driving detection circuit 23. The circuit structures and the operating principles of the detection unit and the strobe outputting units in the third region driving detection circuit 23 are the same as the circuit structures and the operating principles of the detection unit and the strobe outputting units in the first region driving detection circuit 21, which is not repeated.

During a time period between the time t1 and time t4, it is detected whether a touch is present in the first touch region corresponding to the first region driving detection circuit 21, the second touch region corresponding to the second region driving detection circuit 22, and the third touch region corresponding to the third region driving detection circuit 23. At this time, the primary trigger signal SSTV1 corresponding to the first region driving detection circuit 21, the primary trigger signal SSTV2 corresponding to the second region driving detection circuit 22, and the primary trigger signal SSTV3 corresponding to the third region driving detection circuit 23 are not triggered. When it is detected that a touch is present in one or some of the touch regions, the primary trigger signal corresponding to the touch region would be triggered. For example, assuming that the detection circuit has detected that a touch is present in the first touch region corresponding to the first region driving detection circuit 21, a primary trigger signal SSTV1 is triggered by the detection circuit to be inputted from the second trigger signal line STV1 of the first region driving detection circuit 21.

In the timing diagram shown in FIG. 10B, if it is detected that a touch is present in the first region driving detection circuit 21, then before the time t5, the reset signal SREST inputted from the reset signal line REST is at a low level before the display panel is powered on, and is changed to a high level immediately after the display panel is powered on, and the detection circuit triggers the primary trigger signal SSTV1 in the first region driving detection circuit 21 to jump from a low level 0 to a high level 1 at the time t5 in order to trigger the shift register unit 2111 in the first region driving detection circuit 21 to work. At this time, the primary trigger signal SSTV2 in the second region driving detection circuit 22 and the primary trigger signal SSTV3 in the third region driving detection circuit 23 keep at a low level 0, the first potential maintaining signal STXL keeps at a low level 0, the second potential maintaining signal STXH is changed to a pulse signal, and the first control signal SHRSW and the second control signal STXSW is changed to a high level 1, and the first clock signal SCKV1 and the second clock signal SCKV2 are at a low level 0.

At a time t6, the first potential maintaining signal STXL keeps at a low level 0, the second potential maintaining signal STXH is a pulse signal, the first control signal SHRSW and the second control signal STXSW keep at a high level 1, the first clock signal SCKV1 keeps at a low level 0, and the second clock signal SCKV2 is changed from a low level 0 to a high level 1. At this time, the primary trigger signal SSTV1 is received by the shift register inputting terminal IN of the shift register circuit c1 from the first stage of shift register subunit, and the second clock signal SCKV2 is received by the clock signal terminal CK of the shift register circuit c1 from the first stage of shift register subunit, so that the first clock inverter CKINV1 is turned on and the second clock inverter SCINV2 is turned off, and thereby the primary trigger signal SSTV1 having a high level 1 is inputted to the input terminal of the fourth inverter INV4 via the first clock inverter SCKINV1, so that a high level 1 is outputted from the output terminal of the fourth inverter INV4, i.e. the output terminal of the first stage of shift register circuit c1, and such high level 1 is transmitted to the second input terminal of the first stage of NAND gate NAND1 and the shift register inputting terminal of the second stage of shift register circuit.

At a time t7, the primary trigger signal SSTV1 received by the first region driving circuit 21 keeps at a high level 1, the second clock signal SCKV1 keeps at a low level 0, and the second clock signal SCKV2 is changed from a high level 1 to a low level 0, and then a high level 1 is outputted from the output terminal of the first stage of shift register circuit c1. Since the first clock signal SCKV1 is at a low level 0, no touch scanning signal is outputted from the first stage of strobe outputting unit.

During a time period between the time t8 and time t9, the primary trigger signal SSTV1 received by the first region driving circuit 21 is changed to a low level 0, the first clock signal SCKV1 is changed from a low level 0 to a high level 1, the second clock signal SCKV2 keeps at a low level 0, and a low level 0 is outputted from the output terminal of the first stage of NAND gate NAND1. Since the first detection signal SC1 is at a low level 0, the first transmission gate d1 of the first stage of detection subunit is turned on, the low level 0 outputted from the first stage of NAND gate NAND1 is transmitted to the second inverter INV2 of the first stage of strobe outputting unit via the first transmission gate d1 of the first stage of detection subunit, and the third control signal SC1 (having a high level 1) is outputted from the output terminal of the second inverter INV2 to the third control terminal C of the first stage of strobe outputting unit e1 in order to control the first stage of strobe outputting unit e1 to output the touch scanning signal TX1.

At a time t9, the first clock signal SCKV1 is changed from a high level 1 to a low level 0, the second clock signal SCKV2 keeps at a low level 0, the second stage of shift register circuit receives a secondary trigger signal outputted from the first stage of shift register circuit, which is at a high level; a high level 1 is outputted from the shift register outputting terminal of the second stage of shift register circuit, the second clock signal SCKV2 received by the second input terminal of the second stage of NAND gate NAND2 is at a low level 0. At this time, no touch scanning signal is outputted from the output terminal of the second stage of strobe outputting unit.

During a time period between the time t10 and time t11, the second clock signal SCKV2 is jumped from a low level 0 to a high level 1, a high level 1 is received by the first input terminal and the second input terminal of the second stage of NAND gate NAND2, and a low level 0 is outputted from the output terminal of the second NAND gate NAND2. Since the first trigger signal SC1 is at a high level, the first transmission gate d2 of the second stage of detection subunit is turned on to transmit a low level 0 outputted from the second stage of NAND gate NAND2 to the input terminal of the second inverter INV2 of the second stage of strobe outputting unit, and a high level 1 is outputted from the output terminal of the second inverter INV2 to control the output terminal of the second stage of strobe outputting circuit e2 to output the trigger scanning signal TX2.

Subsequent processing is performed as above, until the touch scanning signal is outputted from the output terminal of the strobe outputting circuit in the tenth stage of strobe outputting unit. In this phase, the first stage of strobe outputting unit to the tenth stage of strobe outputting unit sequentially output the touch scanning signals, and the output terminal of each stage of strobe outputting unit is connected with a touch driving electrode. When a finger touches the display panel, the finger and the touch driving electrode and the touch sensing electrode of the display panel form a coupling capacitance, and the touch driving electrode is perpendicular to the touch sensing electrode. Since the capacitance of the touched point is changed, an induction current is flowed from the touch driving electrode and the touch sensing electrode to the touched point, so that the detection circuit can accurately compute a position of the touched point.

A touch is present in the touch region corresponding to one region driving detection circuit, which is intended to explain the disclosure rather than limit the disclosure. In other embodiments of the disclosure, for example, if a touch is present in the touch regions respectively corresponding to the first region driving detection circuit and the second region driving detection circuit, at the time that the touch scanning signals TX1 to TX10 are sequentially outputted from the strobe outputting units of the first region driving detection circuit, the primary trigger signal inputted by the second trigger signal line in the second region driving detection circuit is changed to a high level in order to trigger each stage of shift register subunit in the second region driving detection circuit to work, so as to control stages of strobe outputting units in the second region driving detection circuit to sequentially output the touch scanning signals TX11 to TX20.

Figure 11:
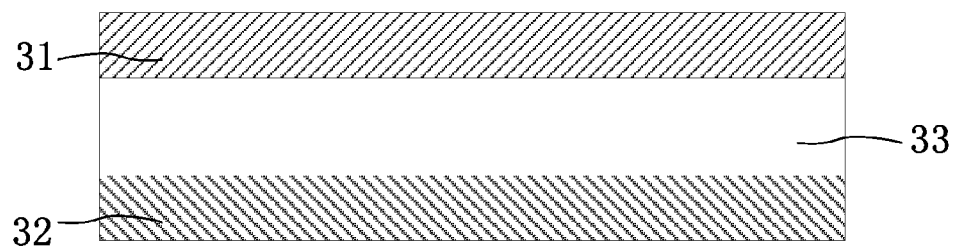
FIG. 11 is a schematic diagram of the structure of a display panel, according to embodiments of the disclosure.

Embodiments of the disclosure further provide a display panel. FIG. 11 is a schematic diagram of the structure of a display panel, according to embodiments of the disclosure. Referring to FIG. 11, the display panel includes an opposite substrate 31, an array substrate 32 disposed opposite to the opposite substrate 31, and an interlayer disposed between the opposite substrate 31 and the array substrate 32, where, the array substrate 32 may include the touch driving detection circuit (not shown) described in the above embodiments.

Specifically, the interlayer 33 is related to the display type of the display panel. When liquid crystal display is utilized, the interlayer 33 may be a liquid crystal layer, the opposite substrate 31 may be a color filter substrate, rotation of liquid crystal molecules within the liquid crystal layer are controlled by an electric field formed between common electrodes provided in the opposite substrate 31 and pixel electrodes provided in the array substrate 32 (corresponding to a twisted nematic electric field) or by an electric field formed between common electrodes and pixel electrodes provided in the array substrate 32 (corresponding to fringe-field switching or plane conversion electric field) to achieve a display function.

When an Organic Light Emitting Diode (OLED) is used for display, the interlayer 33 is configured to provide an organic light emitting layer, and in this case, the opposite substrate 31 may be a color filter substrate, cover glass or cover lens and so on, the organic light emitting layer is controlled by the array substrate 32 to achieve a display function.

Figure 12:
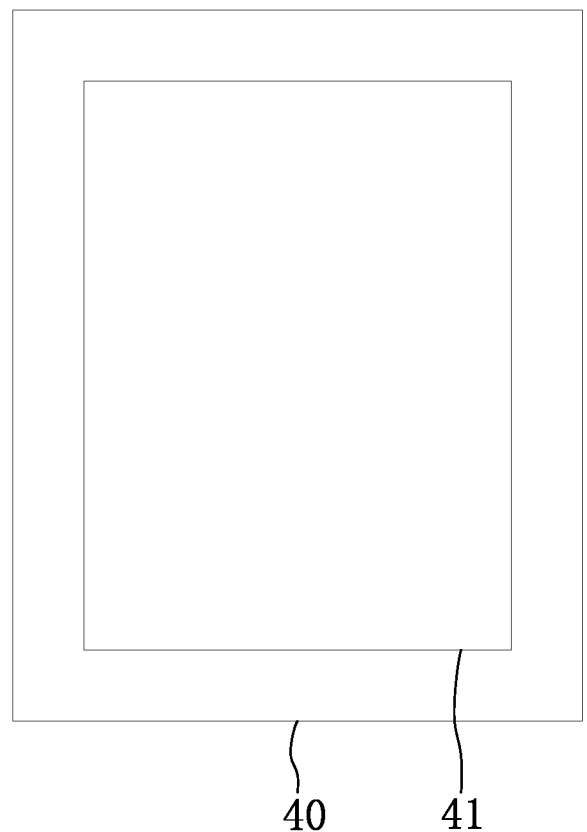
FIG. 12 is a schematic diagram showing the structure of a display device, according to embodiments of the disclosure.

Embodiments of the disclosure further provide a display device. FIG. 12 is a schematic diagram showing the structure of a display device, according to embodiments of the disclosure. Referring to FIG. 12, the display device includes a display panel 41, and may further include a touch driving detection circuit and other devices for supporting a normal operation of the display device 40. The display panel 41 is the display panel described in the above embodiments. The above display device 40 may be one of a cellphone, a desktop computer, a notebook, a tablet computer and an electric paper.

With the touch driving detection circuit, the display panel and the display device, according to embodiments of the disclosure, the touch driving detection circuit includes a plurality of region driving detection circuits, the control module of each region driving detection circuit controls the plurality of stages of strobe outputting units to be turned on simultaneously according to the received detection signal to output the touch scanning signals, and the detection module of each region driving detection circuit detects, according to output touch scanning signals, whether a touch is present in the touch region corresponding to the region driving detection circuit. If a touch is present in the touch region corresponding to the region driving detection circuit, the detection module triggers the trigger signal line in the region driving detection circuit to input a trigger signal to the control module, thereby controlling the plurality of stages of strobe outputting units to be turned on sequentially to output the touch scanning signals sequentially and further determining a specific position of the touched point in the touch region. Since the driving circuit is divided based on regions, before the touch scanning is performed, it is first detected whether a touch is present in the touch region corresponding to each region driving detection circuit. If a touch is present in the touch region, the touch region is scanned sequentially to determine a position of the touched point in the touch region, thereby achieving individual touch of different touch regions, saving time of touch scanning, improving the report rate of the driving detection circuit and decreasing the power consumption of the driving detection circuit.

It is noted that the embodiments and the applied technology principles of the disclosure are described as above. It should be understood that the disclosure is not limited to particular embodiments described herein. Various apparent changes, readjustment and alternative can be made without departing the scope of protection of the disclosure. Therefore, although the disclosure is illustrated in detail through the above embodiments, the disclosure is not limited to the above embodiments, and can further include more of other equivalent embodiments without departing from the concept of the disclosure.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:

1. A touch driving detection circuit, comprising:
a plurality of region driving detection circuits respectively corresponding to a plurality of touch regions;
wherein each of the plurality of region driving detection circuits comprises a control module, a strobe output module, a detection module, a first trigger signal line and a second trigger signal line, and the strobe output module comprises a plurality of stages of strobe output units;
the first trigger signal line is connected with the control module and configured to transmit a first trigger signal to the control module, the control module is configured to control the plurality of stages of strobe output units to be turned on simultaneously according to the first trigger signal to output touch scanning signals simultaneously, and the detection module is configured to detect whether a touch is present in the touch region corresponding to the first trigger signal line according to the touch scanning signals; and
when the detection module has detected that a touch is present in the touch region corresponding to the first trigger signal line, the detection module triggers the second trigger signal line in the region driving detection circuit to input a primary trigger signal to the control module, so that the control module controls the plurality of stages of strobe output units in the region driving detection circuit to be turned on sequentially according to the primary trigger signal to output the touch scanning signals sequentially, thereby determining a location of a touched point in the touch region; and
wherein, the control module comprises a shift register unit and a detection unit, the first trigger signal line is connected with the detection unit, and the second trigger signal line is connected with the shift register unit;
the shift register unit comprises N stages of shift register subunits, the detection unit comprises N stages of detection subunits, the strobe output module comprises N stages of strobe output units, the shift register subunits respectively corresponds to the detection subunits, and the detection subunits respectively correspond to the strobe output units, wherein, N is a positive integer;
the detection subunit comprises a first transmission gate, a first inverter, and a first transistor, and the first transmission gate comprises an input terminal, a positive phase control terminal, a negative phase control terminal, and an output terminal;
the input terminal of the first transmission gate is connected with an output terminal of the shift register subunit corresponding to the detection subunit, the positive phase control terminal and a first terminal of the first transistor are connected with the first trigger signal line corresponding to the region driving detection circuit, and the negative phase control terminal is connected with the first trigger signal line via the first inverter, wherein, the region driving detection circuit comprises the detection unit; and a second terminal of the first transistor is connected with both the output terminal of the first transmission gate and the strobe output unit corresponding to the detection subunit, the second terminal of the first transistor is configured to output a third control signal to the strobe output unit, and a third terminal of the first transistor is configured to receive a first fixed potential.

2. The touch driving detection circuit of claim 1, wherein, when the detection module has detected that a touch is not present in the touch region corresponding to the first trigger signal line, the control module performs next touch detection.

3. The touch driving detection circuit of claim 1, wherein:
the first trigger signal lines corresponding to the plurality of the region driving detection circuits are configured to sequentially receive first trigger signals, to control the first transmission gates of the N stages of detection subunits from each of the region driving detection circuits to be turned off simultaneously, and control the first transistors of the N stages of detection subunits from the region driving detection circuit to be turned on simultaneously, in order to control the N stages of strobe output units to be turned on simultaneously to output the touch scanning signals simultaneously, so that the detection module detects whether a touch is present in the touch region corresponding to the region driving detection circuit; and when the detection module has detected that a touch is present in the touch region corresponding to the first trigger signal line, the first trigger signal line corresponding to the region driving detection circuit receives the second trigger signal to control the first transmission gates of the N stages of the detection subunits from the region driving detection circuit to be turned on, and trigger the second trigger signal line of the region driving detection circuit to input primary trigger signal to the first stage of shift register circuit, in order to control the first stage of strobe output unit to the N-th stage of strobe output unit to be turned on sequentially to output the touch scanning signals sequentially.

4. The touch driving detection circuit of claim 1, wherein:
the shift register subunit comprises a shift register circuit, an NAND gate, a first clock signal line, a second clock signal line and a reset signal line;
the shift register circuit comprises a shift register inputting terminal, a clock signal terminal, a reset terminal and a shift register outputting terminal;
the shift register inputting terminal of the first stage of shift register circuit is connected with the second trigger signal line corresponding to the region driving detection circuit, and the shift register inputting terminal of each of the second stage of shift register circuit to the N-th stage of shift register circuit is connected with the shift register outputting terminal of a preceding stage of shift register circuit, wherein, the region driving detection circuit comprises the shift register circuit;
clock signal terminals of the first stage of shift register circuit to the N-th stage of shift register circuit are alternately connected with the second clock signal line and the first clock signal line;

reset terminals of the first stage of shift register circuit to the N-th stage of shift register circuit are connected with the reset signal line; and
each of the first input terminals of the first to the N-th stages of NAND gates is connected with a shift register outputting terminal of the corresponding shift register circuit, the second input terminals of the first to the N-th stages of NAND gates are alternately connected with the first clock signal line and the second clock signal line, and the output terminals of the first stage of NAND gate to the N-th stage of NAND gate are connected with the corresponding detection subunits, respectively.

5. The touch driving detection circuit of claim 4, wherein, the first clock signal inputted from the first clock signal line is inverse to the second clock signal inputted from the second clock signal line.

6. The touch driving detection circuit of claim 1, wherein:
the strobe output unit comprises a strobe output circuit, a first control line, a second control line, a first potential maintaining line and a second potential maintaining line;
the strobe output circuit comprises a first control terminal, a second terminal, a first potential maintaining terminal, a second potential maintaining terminal, a third control terminal and a strobe output terminal;
the first control terminal, the second control terminal, the first potential maintaining terminal and a second potential maintaining terminal are connected with the first control line, the second control line, the first potential maintaining line and the second potential maintaining line, respectively, the third control terminal is connected with the output terminal of the detection subunit corresponding to the strobe output unit to receive a third control signal outputted by the detection subunit, and the strobe output terminal is configured to output a touch scanning signal according to the received first control signal, the second control signal, the first potential maintaining signal, the second potential maintaining signal and the third control signal.

7. The touch driving detection circuit of claim 6, wherein, the strobe output unit further comprises a second inverter, an input terminal of the second inverter is connected with the second terminal of the first transistor, and an output terminal of the second inverter is connected with the third control terminal of the strobe output circuit.

8. The touch driving detection circuit of claim 7, wherein:
the strobe output circuit comprises a selection circuit, a first buffer circuit, a second buffer circuit, a second transmission gate and a third transmission gate;
a first input terminal of the selection circuit is connected with the first control line, a second input terminal of the selection circuit is connected with the second control line, a third input terminal of the selection circuit is connected with the output terminal of the second inverter, a first output terminal of the selection circuit is connected with an input terminal of the first buffer circuit, and a second output terminal of the selection circuit is connected with an input terminal of the second buffer circuit;
a first output terminal and a second output terminal of the first buffer circuit are connected with a positive phase control terminal and a negative phase control terminal of the second transmission gate, respectively;
a first output terminal and a second output terminal of the second buffer circuit are connected with a negative phase control terminal and a positive phase control terminal of the third transmission gate, respectively; and an input terminal of the second transmission gate and an input terminal of the third transmission gate are connected with the first potential maintaining line and the second potential maintaining line, respectively, and an output terminal of the second transmission gate and an output terminal of the third transmission gate are connected together at a joint which functions as a strobe output terminal of the strobe output circuit.

9. The touch driving detection circuit of claim 1, wherein, the first transistor is an N-type transistor or a P-type transistor.

10. The touch driving detection circuit of claim 9, wherein, if the first transistor is the N-type transistor, the first fixed potential is in a range of −10V to −6V.

11. The touch driving detection circuit of claim 10, wherein:

the first trigger signal is at a high level to control the first transmission gates of the N stages of detection subunits from each of the region driving detection circuits to be turned off simultaneously, and control the first transistor of the N stages of detection subunits to be turned on simultaneously, to input a high level to the N stages of strobe output circuits, in order to control the N stages of strobe output circuits to be turned on simultaneously to output the touch scanning signals simultaneously, thereby detecting whether a touch is present in the touch region corresponding to the region driving detection circuit; and the second trigger signal is at a low level to control the first transmission gates of the N stages of detection subunits from each of the region driving detection circuits to be turned on simultaneously, and when a touch is present in the touch region corresponding to one of the region driving detection circuits, the second trigger signal line of the region driving detection circuit is triggered to input the primary trigger signal to the first stage of shift register circuit, in order to control the first stage of shift register circuit to the N-th stage of shift register circuit to output a high level sequentially, and hence the output terminals of the first stage of NAND gate to the N-th stage of NAND gate output a low level and transmits the low level to the second inverter of corresponding strobe output units via the first transmission gates of corresponding detection subunits, so as to control the first stage of strobe output circuit to the N-th stage of strobe output circuit to be turned on sequentially to output the touch scanning signals sequentially.

12. A display panel, comprising the touch driving detection circuit of claim 1.

13. A display device, comprising the display panel of claim 12.

* * * * *